US012587772B2

(12) United States Patent
Tyson et al.

(10) Patent No.: US 12,587,772 B2
(45) Date of Patent: Mar. 24, 2026

(54) MICROPHONE PORT FOR ACOUSTIC SUPPRESSION

(71) Applicant: Apple Inc., Cupertino, CA (US)

(72) Inventors: Anders Fabricius Tyson, San Jose, CA (US); Jarrett B. Lagler, San Francisco, CA (US); Martin Kuster, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 18/739,908

(22) Filed: Jun. 11, 2024

(65) Prior Publication Data

US 2025/0380077 A1 Dec. 11, 2025

(51) Int. Cl.
*H04R 1/08* (2006.01)
*H04R 1/10* (2006.01)

(52) U.S. Cl.
CPC ........... *H04R 1/086* (2013.01); *H04R 1/1016* (2013.01); *H04R 1/1075* (2013.01); *H04R 2410/07* (2013.01)

(58) Field of Classification Search
CPC .... H04R 1/086; H04R 1/1016; H04R 1/1075; H04R 2410/07
See application file for complete search history.

(56) References Cited

U.S. PATENT DOCUMENTS

| | | | | |
|---|---|---|---|---|
| 11,044,565 | B2 | 6/2021 | Wichmann et al. | |
| 11,206,472 | B2 | 12/2021 | Cousins et al. | |
| 11,665,455 | B2 | 5/2023 | Hua et al. | |
| 2006/0291686 | A1 | 12/2006 | Hlas et al. | |
| 2012/0253798 | A1 | 10/2012 | Walters et al. | |
| 2014/0299949 | A1 * | 10/2014 | Conti | B81C 1/00158 438/51 |
| 2021/0099778 | A1 * | 4/2021 | Hua | H04R 1/02 |

FOREIGN PATENT DOCUMENTS

EP 3471434 A1 4/2019

* cited by examiner

*Primary Examiner* — Paul W Huber

(74) *Attorney, Agent, or Firm* — Aikin & Gallant, LLP

(57) ABSTRACT

A transducer port assembly comprising: a frame defining an acoustic chamber having an opening to an ambient environment and one or more interior sloping surfaces coupled to an acoustic port of a transducer; an acoustic mesh coupled to the opening to the ambient environment; and a blocking member coupled to the acoustic mesh to acoustically close a portion of the acoustic mesh.

21 Claims, 3 Drawing Sheets

MICROPHONE PORT FOR ACOUSTIC SUPPRESSION

FIELD

An embodiment is directed to a microphone port configuration that suppresses or attenuates ultrasound frequencies and/or wind noise preventing them from impacting the microphone. Other embodiments are also described and claimed.

BACKGROUND

Portable listening devices can be used with a wide variety of electronic devices such as portable media players, smart phones, tablet computers, laptop computers, stereo systems, and other types of devices. Portable listening devices have historically included one or more small speakers configured to be placed on, in, or near a user's ear, structural components that hold the speakers in place, and a cable or wireless connection an audio source. In addition, portable listening devices may include one or more microphones that pickup nearby sounds to enable, for example, noise cancellation or other device functions. Such portable listening devices can include, for instance, wireless earbud devices or in-ear hearing devices that operate in pairs (one for each ear) or individually for outputting sound to, and receiving sound from, the user. In some aspects, however, such devices may also pickup undesirable ambient noises and/or ultrasonic frequencies within the environment, for example, wind noise and/or ultrasonic frequencies emitted by sensors found within a room or the surrounding environment, that may interfere with device performance (e.g., microphone pickup of desirable sounds).

SUMMARY

Portable listening devices such as earbuds may include a microphone, for example, an external microphone that picks up sounds from the ambient environment surrounding the device. For example, the microphone may pick up the user's voice, pick up ambient noise (e.g., for noise cancellation), or be used for other purposes. A microphone picking up sounds from the ambient environment may, however, be sensitive to undesirable sounds such as wind noise and ultrasonic frequencies within the ambient environment, particularly in cases where the microphone signal is amplified. To reduce the sensitivity of the microphone to undesirable noise and/or frequencies, the acoustic port from the ambient environment to the microphone may have a particular configuration selected to suppress or mitigate undesirable noise and/or frequencies. Representatively, in some aspects, a mesh and a cavity dimensioned to suppress ultrasonic frequencies may be coupled to, or form a portion of, the microphone port. For example, the cavity may be formed around the microphone port and define a sloped surface from an outer edge of the cavity to the microphone port that ensures the pressure contributions from the outer parts of the mesh area covering the cavity have a lower impedance by lowering the acoustic mass. In still further aspects, the mesh may have a non-acoustically transparent or acoustically closed portion that is further configured to block ultrasonic frequencies and/or undesirable noises from passing through the mesh. The combination of the sloped cavity and the acoustically closed mesh may be used to mitigate or otherwise suppress ultrasonic frequencies and/or undesirable noises from reaching the microphone and interfering with the microphone function (e.g., sound pickup for noise cancellation).

In one aspect, a transducer port assembly includes a frame defining an acoustic chamber having an opening to an ambient environment and one or more interior sloping surfaces coupled to an acoustic port of a transducer; an acoustic mesh coupled to the opening to the ambient environment; and a blocking member coupled to the acoustic mesh to acoustically close a portion of the acoustic mesh. In other aspects, the opening to the ambient environment is larger than the acoustic port of the transducer. In some aspects, at least one interior sloping surface of the one or more interior sloping surfaces is inclined upwards when moving in a direction from a side wall of the frame defining the opening to the acoustic port. In still further aspects, the frame comprises a side wall that surrounds the one or more interior sloping surfaces, and a height of the acoustic chamber near the side wall is greater than a height of the acoustic chamber near the acoustic port. In other aspects, an angle of a slope defined by the one or more interior sloping surfaces is between zero degrees and ninety degrees. In some aspects, the acoustic port includes a rectangular shape and an interior sloping surface of the one or more interior sloping surfaces extends from each side of the rectangular shape. In some aspects, the acoustic port includes a circular shape and the one or more interior sloping surfaces entirely surround the circular shape. In still further aspects, the blocking member acoustically closes from ten percent to ninety percent of the acoustic mesh. In some aspects, the blocking member is coupled to a portion of the acoustic mesh with a highest coherence for wind noise. In other aspects, the blocking member is coupled to a center of the acoustic mesh and aligned over the acoustic port. In still further aspects, the transducer includes a microphone.

In other aspects, a portable electronic device includes an enclosure defining an interior chamber separated from an ambient environment surrounding the enclosure; a frame defining an acoustic chamber having an opening to the ambient environment and one or more interior sloping surfaces coupled to an acoustic port of a transducer positioned within the interior chamber of the enclosure; an acoustic mesh coupled to the opening to the ambient environment; and a blocking member coupled to the acoustic mesh to acoustically close a portion of the acoustic mesh. In some aspects, the opening to the ambient environment extends through the enclosure. In still further aspects, the one or more interior sloping surfaces define a bottom portion of the acoustic chamber and are inclined upwards when moving in a direction from a side wall of the frame defining the opening to the acoustic port. In some aspects, the frame includes a side wall that extends from the opening to the one or more interior sloping surfaces, and a height of the acoustic chamber near the side wall is greater than a height of the acoustic chamber near the acoustic port. In other aspects, an angle of a slope defined by the one or more interior sloping surfaces is between zero degrees and forty-five degrees. In other aspects, the acoustic port is entirely surrounded by the one or more interior sloping surfaces. In some aspects, the blocking member comprises a metal stiffener coupled to a center of the acoustic mesh and aligned over the acoustic port. In still further aspects, the transducer comprises a microphone. In some aspects, the enclosure comprises an earbud enclosure.

In still further aspects, an earbud includes an earbud enclosure defining an interior chamber separated from an ambient environment surrounding the earbud enclosure; a frame defining an acoustic chamber having an opening to the ambient environment and one or more interior sloping surfaces coupled to an acoustic port of a microphone positioned within the interior chamber of the earbud enclosure; an acoustic mesh coupled to the opening to the ambient environment; and a blocking member coupled to the acoustic mesh to acoustically close a center portion of the acoustic mesh. In other aspects, at least one interior sloping surface of the one or more interior sloping surfaces is a flat surface inclined upwards when moving in a direction from a side wall of the frame defining the opening to the acoustic port. In still further aspects, at least two interior sloping surfaces of the one or more interior sloping surfaces extend in different directions from the acoustic port to a side wall of the frame. In some aspects, the interior sloping surfaces define a bottom surface of the acoustic chamber having a frustoconical shape around the acoustic port. In other aspects, the blocking member comprises a metal stiffener coupled to the center of the acoustic mesh.

The above summary does not include an exhaustive list of all aspects. It is contemplated that the aspects includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred aspects with reference to the appended drawings. Whenever the shapes, relative positions and other aspects of the parts described are not clearly defined, the scope is not limited only to the parts shown, which are meant merely for the purpose of illustration. Also, while numerous details are set forth, it is understood that some aspects may be practiced without these details. In other instances, well-known structures and techniques have not been shown in detail so as not to obscure the understanding of this description.

The terminology used herein is for the purpose of describing particular aspects only and is not intended to be limiting. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
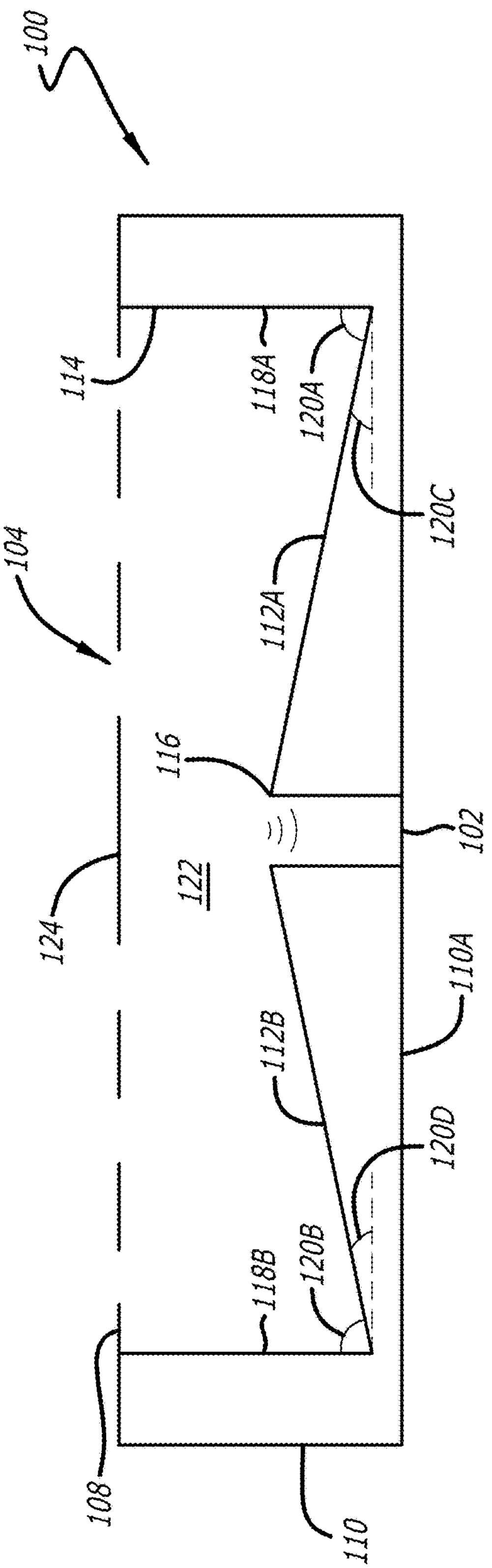
FIG. 1 illustrates a simplified schematic cross-sectional side view of one aspect of an acoustic port assembly.

FIG. 1 illustrates a simplified schematic cross-sectional side view of one aspect of an acoustic port assembly. Assembly 100 may include a transducer 102 having an acoustic port 104 that opens to the ambient environment 106. In some aspects, transducer 102 may be a microphone or microphone module that converts sound (e.g., audible acoustic signals) into electrical signals. For example, sound from the ambient environment 106 may pass through a mesh 108 coupled to acoustic port 104 to transducer 102. The sound is then picked up by transducer 102 (e.g., microphone), which then converts the sound to an electrical signal for further processing (e.g., noise cancellation). In some aspects, however, the sound or acoustic input may also include undesirable noises or audio frequencies from the ambient environment 106. To reduce the impact of the undesirable noise or frequencies on the transducer 102, assembly 100 may further include a particular port and/or mesh structure configured to suppress or mitigate the undesirable noise and/or frequencies.

Representatively, in some aspects, acoustic port 104 may include an enclosure or frame 110 that forms an acoustic chamber 122 having one or more interior sloping surfaces 112A, 112B surrounding transducer 102. For example, frame 110 may include side portions or side walls 118A, 118B that form the sides or outer edges of port 104. Representatively, walls 118A, 118B may, in some aspects, define an enlarged opening 114 to ambient environment 106. For example, enlarged opening 114 may be larger than an opening 116 within the housing, casing or module containing the transducer components. Mesh 108 may cover enlarged opening 114 and be attached to the top ends of walls 118A, 118B by an adhesive, or other attachment mechanism. In some aspects, mesh 108 may be constructed as a single layer with contours that conform to a topography of an external surface of frame 110 or a device housing or enclosure frame is coupled to. In some instances, acoustic mesh 108 can be a porous layer that is tuned to a specific acoustic impedance to enable proper operation of the underlying transducer 102. In some aspects, acoustic mesh 108 is formed of a pliable, porous material, such as a porous polyester, and/or may be covered with a hydrophobic coating that enables acoustic mesh 108 to resist ingress of water into the housing of the wireless listening device. An external surface of acoustic mesh 108 may be exposed (or face) the ambient environment 106 and an internal surface of acoustic mesh 108 may be exposed, share a volume with, or otherwise face, acoustic cavity 122.

Frame 110 may further include a bottom portion 110A which forms the interior sloping surfaces 112A, 112B that extend from the outer edges of port 104 formed by walls 118A, 118B to transducer 102. In some aspects, interior sloping surfaces 112A, 112B may be considered to have a slope that is inclined upwards when moving in a direction from walls 118A, 118B to transducer 102. Interior sloping surfaces 112A, 112B may be considered generally smooth, flat, or otherwise not having any significant surface variations. In this aspect, interior sloping surfaces 112A, 112B may be considered to form a volcano, frustoconical or pyramid like shaped surface around transducer 102. This volcano, frustoconical or pyramid like shape formed by surfaces 112A, 112B within chamber 122 ensures that the pressure contributions from outer parts of mesh 108 have a lower impedance by lowering the acoustic mass, which in turn, enables the suppression of ultrasonic frequencies within chamber 122. Representatively, the incline or slope of the interior sloping surfaces 112A, 112B may be considered to form an acute angle 120A, 120B relative to walls 118A, 118B. Said another way, the interior sloping surfaces 112A, 112B may be defined by an acute angle 120C, 120D formed relative to horizontal. In either case, it should be understood that interior sloping surfaces 112A, 112B may have an average incline or slope greater than zero degrees and less than ninety degrees, for example, from about five degrees to about seventy-five degrees, or from about ten degrees to about forty-five degrees. In some aspects, the slope of surfaces 112A, 112B may be tuned or otherwise selected to achieve the desired level of ultrasound suppression and/or mitigation.

To further facilitate the suppression or reduction of undesirable ambient noises on transducer 102, for example wind noise, assembly 100 may further include a noise blocking member 124. Representatively, blocking member 124 may be an acoustically closed member coupled to mesh 108 at a particular location found to achieve maximum wind noise attenuation. For example, the spatial coherence for wind noise decays exponentially with distance and therefore picking up pressure from points that are further away leads to more wind noise attenuation. In this aspect, it has been found that positioning blocking member 124 at a center portion of mesh 108 effectively limits the contribution of the point with the highest coherence for wind noise, and achieves maximum wind noise attenuation. Blocking member 124 may, for example, be part of a mesh stack up and positioned within the center portion of mesh 108. For example, blocking member 124 may be a metal stiffener or other acoustically non-transparent material that is adhered to, or integrally formed with, mesh 108 and can prevent noise from passing through certain portions (e.g., the middle portion) that member 124 is attached to. In some aspects, blocking member 124 may be attached only to mesh 108 and not contact or otherwise be directly coupled to any other portions of frame 110 or transducer 102, for example, a microphone. In some aspects, the area of mesh 108 blocked by blocking member 124 may be tuned to achieve the desired amount of wind noise attenuation. Representatively, in some aspects, from about ten to about ninety percent of the mesh surface area may be covered or blocked by blocking member 124 to prevent the passage of wind noise.

Figure 2:
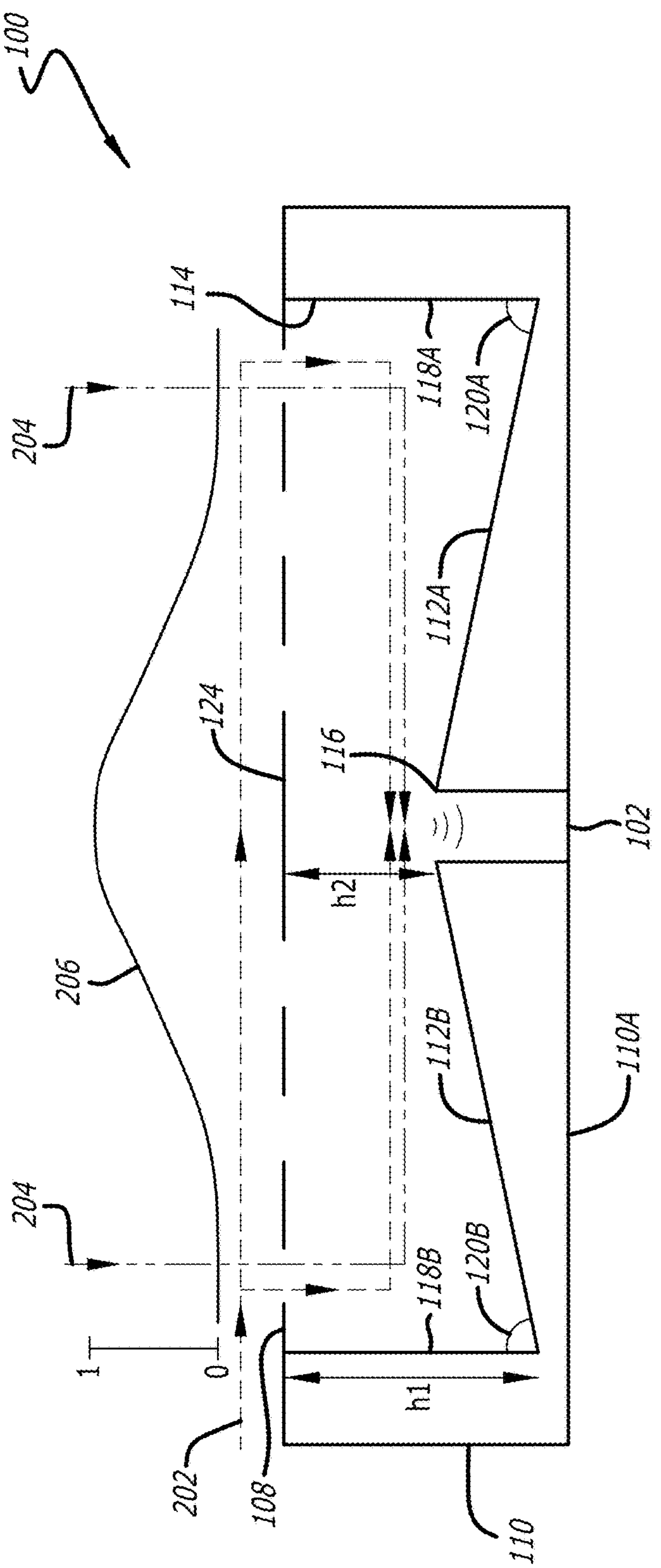
FIG. 2 illustrates a simplified schematic cross-sectional side view of another aspect of an acoustic port assembly.

Referring now to FIG. 2, FIG. 2 illustrates in more detail the wind and ultrasonic frequency suppression aspects discussed in reference to FIG. 1. Assembly 100 illustrated in FIG. 2 includes the same components as described in reference to FIG. 1 therefore the descriptions of each of the components will not be repeated in reference to FIG. 2. As previously discussed, the aspects disclosed herein are configured to suppress wind noise and ultrasonic frequencies found within the ambient environment (e.g., proximity sensors in the ceiling of a room) which may enter assembly 100 and negatively impact system transparency, noise cancellation and potentially create artifacts. Representatively, as can be seen from FIG. 2, acoustic waves, for example ultrasound waves, may be emitted from sensors within the ceiling and walls of the ambient environment 106 and follow, for example, one or more of paths 202, 204 to assembly 100. Since the source of the acoustic waves and direction they travel is generally known, assembly 100 can be designed in a way to attenuate, for example, ultrasound waves traveling along paths 202, 204. Representatively, there is a wavelength/phase difference between path 202 and path 204. Path 202 may represent an acoustic wave (or waves) coming from one direction, for example, ultrasound waves coming from the ceiling. Path 204 represents an acoustic wave coming from a different direction. Assembly 100 can therefore be configured to attenuate acoustic waves entering assembly 100 from the different paths 202, 204. In this aspect, assembly 100 may include interior sloping surfaces 112A, 112B running in a same direction as paths 202 and/or 204 to attenuate, suppress or otherwise block acoustic waves at ultrasonic frequencies entering assembly 100 along paths 202 and/or 204 from negatively impacting transducer 102. It may further be understood that although interior sloping surface 112A, 112B along two sides of opening 116 to transducer 102 are illustrated, fewer or additional interior sloping surfaces around opening 116 are contemplated. For example, interior sloping surfaces may be formed entirely around opening 116 to attenuation acoustic waves traveling in all directions toward opening 116, as will be described in more detail in reference to FIGS. 4-5. In addition, it should be understood that while interior sloping surfaces 112A, 112B are shown having a same or similar slope or angle relative to the sidewall or horizontal, they may have different slopes. For example, interior sloping surface 112A may be steeper than interior sloping surface 112B, or vice versa. In some aspects, the slope of surfaces 112A, 112B may be tuned or otherwise selected to achieve the desired level of ultrasound suppression and/or mitigation.

The wind noise suppression aspects of assembly 100 are further illustrated in FIG. 2. Representatively, wind noise is made up of random signals, and characterized through spatial coherence which tells you between two points in space how they correlate to each other. The coherence is illustrated in FIG. 2 by line 206. Line 206 illustrates that the spatial coherence for wind noise is highest at the point right above transducer 102 and decreases exponentially with distance from this center point. In this aspect, picking up pressure from points that are further away from transducer 102 leads to more wind noise attenuation. Accordingly, positioning blocking member 124 in the center (and covering as much of the center as possible) limits the contribution of the point with the highest coherence for wind noise leading to maximum wind noise attenuation overall. In addition, with respect to the noise or ultrasonic frequencies that do enter through open areas of mesh 108 to chamber 122, the interior sloping surfaces 112A, 112B create different resistances within areas of chamber 122 farthest from port 116 (i.e., areas with less coherence) and areas closest to port 116 (i.e., areas with greater coherence), and in turn, allow for attenuation of undesirable noises and/or frequencies, while allowing desired sounds to reach transducer 102. For example, chamber 122 may be wider or have a height (h1) at areas farther from port 116, and narrower or have a height (h2) at areas closer to port 116 due to the slope or incline of the interior sloping surfaces 112A, 112B. This, in turn, creates areas within chamber 122 of less resistance farther from port 116 (e.g., near side walls 118A, 118B), than areas near port 116, and ensures that the pressure contributions from the outer parts of mesh 108 have a lower impedance by lowering the acoustic mass.

Figure 3:
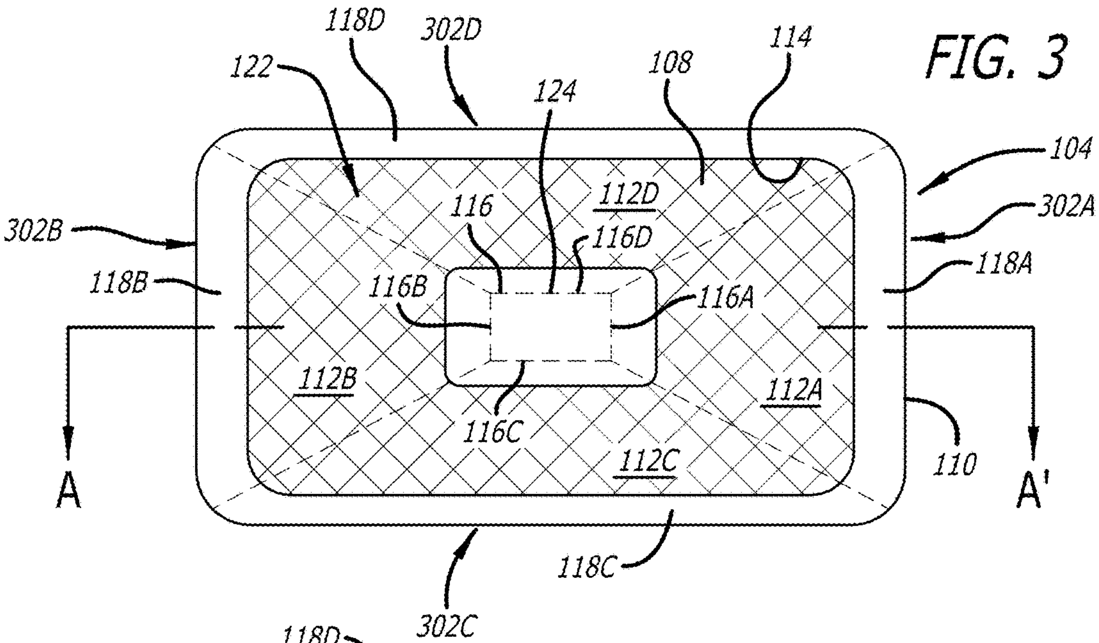
FIG. 3 illustrates a top plan view of one aspect of an acoustic port assembly.

Referring now to FIG. 3, FIG. 3 illustrates a top plan view of the acoustic port assembly of FIGS. 1-2. Representatively, FIGS. 1-2 may be cross-sectional views along line A-A' of port 104 of FIG. 3. From the top plan view illustrated in FIG. 3, it can be seen that acoustic port 104 may, in some aspects, have a rectangular shape formed by side walls 118A, 118B, 118C, 118D. For example, as can be seen from FIG. 3, side walls 118A and 118B may be shorter than side walls 118C and 118D, such that a generally rectangular shaped enlarged opening 114 is formed. In addition, the smaller opening 116 within the housing, casing or module containing the components of transducer 102 may have a similar rectangular shape formed by interior sides or interior side walls 116A, 116B, 116C, 116D of the housing, casing or module. In this aspect, as can further be understood from FIG. 3, interior sloping surfaces 112A, 112B extend from outer side walls 118A, 118B to interior side walls 116A, 116B, respectively. In addition, interior sloping surfaces 112C, 112D extend from outer side walls 118C, 118D to interior side walls 116C, 116D, respectively. Interior sloping surfaces 112C, 112D may have the same or similar slope as interior sloping surfaces 112A, 112B such that a volcano or pyramid like shape is formed entirely around opening 116. In other aspects, one or more of interior sloping surfaces 112A, 112B, 112C, 112D may have a different slope than another of the surfaces. All of surfaces 112A, 112B, 112C, 112D, however, will have some degree of incline or slope such that acoustic waves (e.g., wind noise and/or ultrasonic frequencies) coming into chamber 122 of port 104 from at least four different directions illustrated by arrows 302A, 302B, 302C, 302D may be attenuated.

In addition, it can further be understood from FIG. 3 that blocking member 124 is positioned or otherwise coupled to mesh 108 at the point with the highest coherence for wind noise. As previously discussed, the point of highest coherence for wind noise may be the center of mesh 108, therefore blocking member 124 may be located at the center of mesh 108 such that wind noise is blocked from passing through mesh 108 within this area. Representatively, blocking member 124 is aligned with and positioned over opening 116, and within a center of the area of mesh 108 covering opening 114. Blocking member 124 may have a similar shape to that of openings 114, 116. For example, blocking member 124 may have a rectangular shape as shown. The size of blocking member 124, and in turn the area of mesh 108 blocked by blocking member 124, may be tuned for maximum wind noise and/or ultrasonic frequency attenuation. Representatively, in some aspects, blocking member 124 may be tuned to block, cover, acoustically close or otherwise prevent the passage of acoustic waves through about ten to about ninety percent of the surface area of mesh 108.

Figure 4:
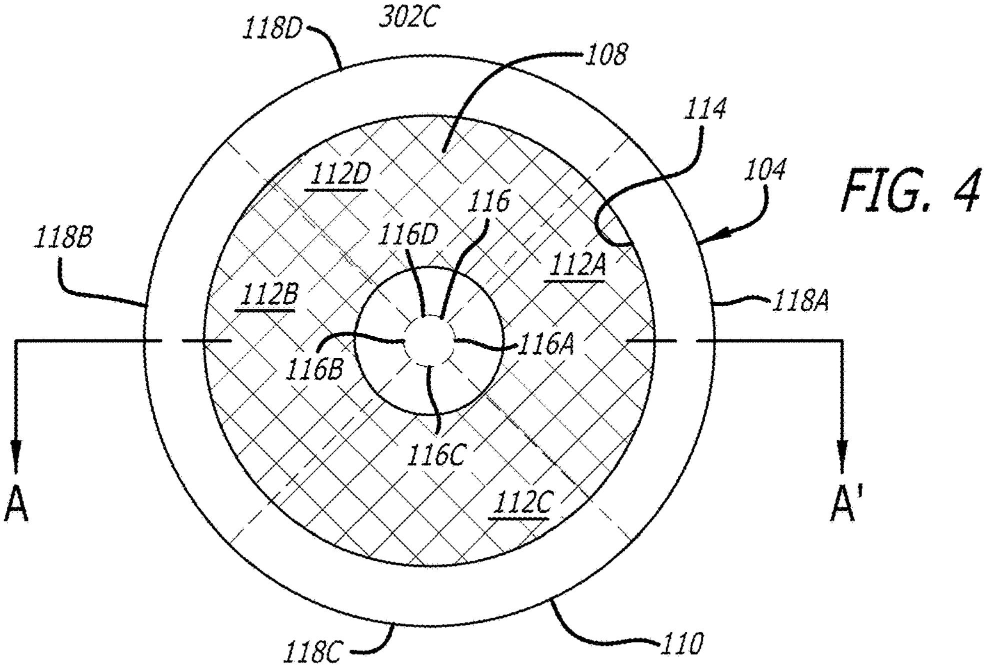
FIG. 4 illustrates a top plan view of another aspect of an acoustic port assembly.

Referring now to FIG. 4, FIG. 4 illustrates a top plan view of another aspect of the acoustic port assembly of FIGS. 1-2. Representatively, FIGS. 1-2 may be considered cross-sectional views along line A-A' of port 104 of FIG. 4. From the top plan view illustrated in FIG. 4, it can be seen that acoustic port 104 may, in some aspects, have a circular shape formed by side walls or portions 118A, 118B, 118C, 118D. In addition, the smaller opening 116 within the housing, casing or module containing the components of transducer 102 may have a similar circular shape formed by interior sides, interior side walls or interior portions 116A, 116B, 116C, 116D of the housing, casing or module. In this aspect, as can further be understood from FIG. 4, interior sloping surfaces 112A, 112B extend from outer side walls or portions 118A, 118B to interior side walls or portions 116A, 116B, respectively. In addition, interior sloping surfaces 112C, 112D extend from outer side walls or portions 118C, 118D to interior side walls 116C, 116D, respectively. Interior sloping surfaces 112C, 112D may have the same or similar slope as interior sloping surfaces 112A, 112B such that a volcano, frustoconical or cone like shape is formed entirely around opening 116. In other aspects, one or more of interior sloping surfaces 112A, 112B, 112C, 112D may have a different slope than another of the surfaces. All of surfaces 112A, 112B, 112C, 112D, however, will have some degree of incline or slope such that acoustic waves (e.g., wind noise and/or ultrasonic frequencies) coming into chamber 122 of port 104 from all directions may be attenuated.

In addition, it can further be understood from FIG. 4 that blocking member 124 is positioned or otherwise coupled to mesh 108 at the point with the highest coherence for wind noise. As previously discussed, the point of highest coherence for wind noise may be the center of mesh 108, therefore blocking member 124 may be located at the center of mesh 108 such that wind noise is blocked from passing through mesh 108 within this area. Representatively, blocking member 124 is aligned with and positioned over opening 116, and within a center of the area of mesh 108 covering opening 114. Blocking member 124 may have a similar shape to that of openings 114, 116. For example, blocking member 124 may have a circular shape as shown. The size of blocking member 124, and in turn the area of mesh 108 blocked by blocking member 124, may be tuned for maximum wind noise and/or ultrasonic frequency attenuation. Representatively, in some aspects, blocking member 124 may be tuned to block, cover, acoustically close or otherwise prevent the passage of acoustic waves through about ten to about ninety percent of the surface area of mesh 108.

Figure 5:
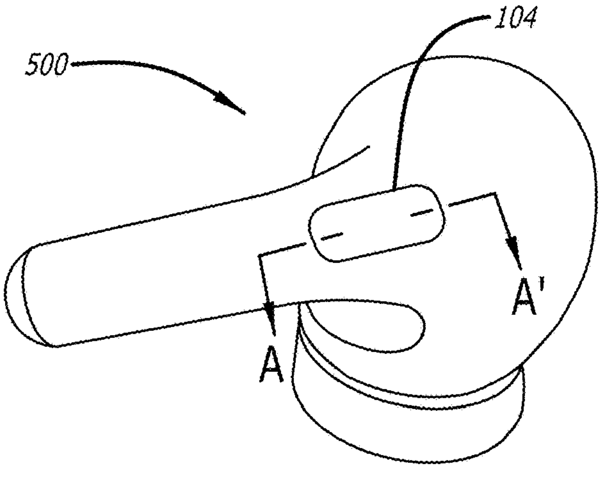
FIG. 5 illustrates a perspective view of one aspect of an acoustic port assembly for a microphone in a housing.

Referring now to FIG. 5, FIG. 5 illustrates a perspective view of a portable electronic device within which the acoustic port for wind noise and/or ultrasound suppression and transducer as described herein may be implemented. For example, the portable electronic device may be a portable listening device 500 such as an earbud having a housing or enclosure that defines an interior chamber separated from the ambient environment for containing the device components. In this aspect, the housing or enclosure forming device 500 may define an acoustic port 104 to a transducer (e.g., transducer 102), for example, a top or reference microphone used for transparency and/or active noise cancellation (ANC). As can further be understood from this view, since acoustic port 104 is near the top of the device 500, when device 500 is positioned within the user's ear, port 104 will typically be facing in a generally upward and/or outward position relative to the user. In this aspect, port 104 will be susceptible to acoustic waves, such as ultrasonic waves, emitted from the ceiling of a room the user is located in, for example, by proximity or occupancy sensors configured to indicate a person is in the room. In this aspect, acoustic port 104 is configured as previously discussed to attenuate or mitigate undesirable frequencies and/or acoustic waves emitted from these known sources.

Figure 6:
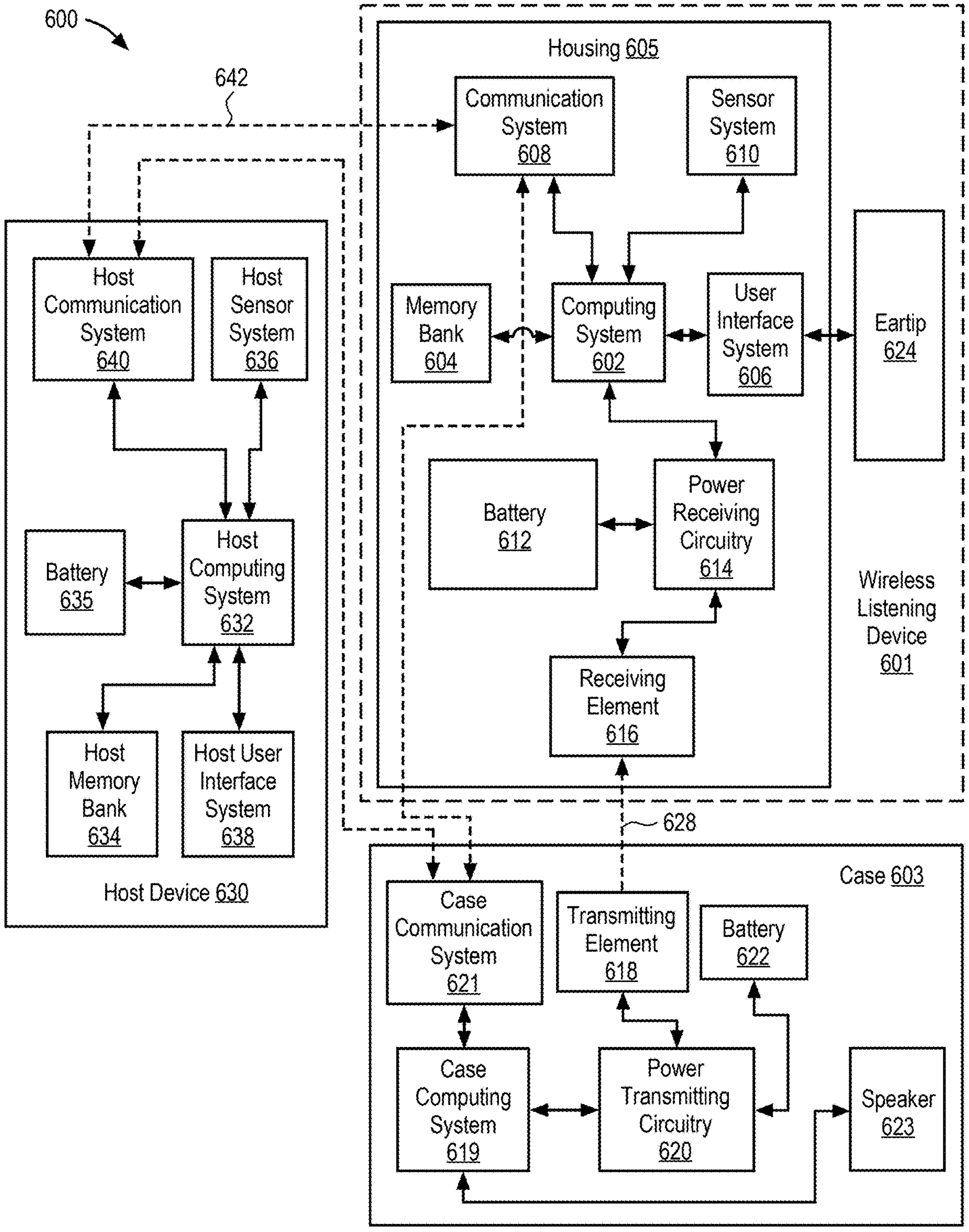
FIG. 6 illustrates a block diagram of a portable electronic listening device system including an exemplary wireless listening device with which the acoustic port assembly may be associated.

FIG. 6 illustrates a block diagram of some of the constituent components of a portable listening device in which the acoustic port assembly disclosed herein may be implemented. The portable electronic listening device system 600 may include an exemplary wireless listening device 601, according to some embodiments of the present disclosure. Wireless listening device 601, as mentioned above, can include a housing 605 the defines an interior chamber for containing the device components. For example, housing 605 can be an electronic device housing component that generates and receives sound to provide an enhanced user interface for a host device 630. Housing 605 can include a computing system 602 coupled to a memory bank 604. Computing system 602 can execute instructions stored in memory bank 604 for performing a plurality of functions for operating housing 605. Computing system 602 can be one or more suitable computing devices, such as microprocessors, computer processing units (CPUs), graphics processing units (GPUs), field programmable gate arrays (FPGAs), and the like.

Computing system 602 can also be coupled to a user interface system 606, communication system 608, and a sensor system 610 for enabling housing 605 to perform one or more functions. For instance, user interface system 606 can include a driver (e.g., speaker) for outputting sound to a user, microphone for inputting sound from the environment or the user, and any other suitable input and output device. Communication system 608 can include Bluetooth components for enabling housing 605 to send and receive data/commands from host device 630. Sensor system 610 can include optical sensors, accelerometers, microphones, and any other type of sensor that can measure a parameter of an external entity and/or environment.

Housing 605 can also include a battery 612, which can be any suitable energy storage device, such as a lithium-ion battery, capable of storing energy and discharging stored energy to operate housing 605. The discharged energy can be used to power the electrical components of housing 605. In some embodiments, battery 612 can also be charged to replenish its stored energy. For instance, battery 612 can be coupled to power receiving circuitry 614, which can receive current from receiving element 616. Receiving element 616 can electrically couple with a transmitting element 618 of a case 603 in embodiments where receiving element 616 and transmitting element 618 are configured as exposed electrical contacts. Case 603 can include a battery 622 that can store and discharge energy to power transmitting circuitry 620, which can in turn provide power to transmitting element 618. The provided power can transfer through an electrical connection 628 and be received by power receiving circuitry 614 for charging battery 612. While case 603 can be a device that provides power to charge battery 612 through receiving element 616, in some embodiments, case 603 can also be a device that houses wireless listening device 601 for storing and provide protection to wireless listening device 601 while it is stored in case 603.

Case 603 can also include a case computing system 619 and a case communication system 621. Case computing system 619 can be one or more processors, ASICs, FPGAs, microprocessors, and the like for operating case 603. Case computing system 619 can be coupled to power transmitting circuitry 620 for operating the charging functionalities of case 603, and case computing system 619 can also be coupled to case communication system 621 for operating the interactive functionalities of case 603 with other devices, e.g., housing 605. In some embodiments, case communication system 621 is a Bluetooth component, or any other suitable communication component, that sends and receives data with communication system 608 of housing 605, such as an antenna formed of a conductive body. That way, case 603 can be apprised of the status of wireless listening device 601 (e.g., charging status and the like). Case 603 can also include a speaker 623 coupled to case computing system 619 so that speaker 623 can emit audible noise capable of being heard by a user for notification purposes.

Host device 630, to which housing 605 is an accessory, can be a portable electronic device, such as a smart phone, tablet, or laptop computer. Host device 630 can include a host computing system 632 coupled to a battery 635 and a host memory bank 634 containing lines of code executable by host computing system 632 for operating host device 630. Host device 630 can also include a host sensor system 636, e.g., accelerometer, gyroscope, light sensor, and the like, for allowing host device 630 to sense the environment, and a host user interface system 638, e.g., display, speaker, buttons, touch screen, and the like, for outputting information to and receiving input from a user. Additionally, host device 630 can also include a host communication system 640 for allowing host device 630 to send and/or receive data from the Internet or cell towers via wireless communication, e.g., wireless fidelity (WIFI), long term evolution (LTE), code division multiple access (CDMA), global system for mobiles (GSM), Bluetooth, and the like. In some embodiments, host communication system 640 can also communicate with communication system 608 in housing 605 via wireless communication line 642 so that host device 630 can send sound data to housing 605 to output sound, and receive data from housing 605 to receive user inputs. Communication line 642 can be any suitable wireless communication line such as Bluetooth connection. By enabling communication between host deice 630 and housing 605, wireless listening device 601 can enhance the user interface of host device 630. FIG. 5 illustrates an example of a representative portable electronic listening device system.

While certain aspects have been described and shown in the accompanying drawings, it is to be understood that such embodiments are merely illustrative of and not restrictive on the broad aspects, and that the aspects are not limited to the specific constructions and arrangements shown and described, since various other modifications may occur to those of ordinary skill in the art. The description is thus to be regarded as illustrative instead of limiting. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A transducer port assembly comprising:

a frame defining an acoustic chamber having an opening to an ambient environment and one or more interior sloping surfaces coupled to an acoustic port of a transducer and the one or more interior sloping surfaces defining a bottom portion of the acoustic chamber such that the acoustic chamber comprises a greater height near a side wall than near the acoustic port;

an acoustic mesh coupled to the opening to the ambient environment; and a blocking member coupled to the acoustic mesh to acoustically close a portion of the acoustic mesh.

2. The transducer port assembly of claim 1 wherein the opening to the ambient environment is larger than the acoustic port of the transducer.

3. The transducer port assembly of claim 1 wherein at least one interior sloping surface of the one or more interior sloping surfaces is inclined upwards when moving in a direction from a side wall of the frame defining the opening to the acoustic port.

4. The transducer port assembly of claim 1 wherein the side wall surrounds the one or more interior sloping surfaces.

5. The transducer port assembly of claim 1 wherein an angle of a slope defined by the one or more interior sloping surfaces is between zero degrees and ninety degrees.

6. The transducer port assembly of claim 1 wherein the acoustic port comprises a rectangular shape and an interior sloping surface of the one or more interior sloping surfaces extends from each side of the rectangular shape.

7. The transducer port assembly of claim 1 wherein the acoustic port comprises a circular shape and the one or more interior sloping surfaces entirely surround the circular shape.

8. The transducer port assembly of claim 1 wherein the blocking member acoustically closes from ten percent to ninety percent of the acoustic mesh.

9. The transducer port assembly of claim 1 wherein the blocking member is coupled to a portion of the acoustic mesh with a highest coherence for wind noise.

10. The transducer port assembly of claim 1 wherein the blocking member is coupled to a center of the acoustic mesh and aligned over the acoustic port.

11. The transducer port assembly of claim 1 wherein the transducer comprises a microphone.

12. A portable electronic device comprising:

an enclosure defining an interior chamber separated from an ambient environment surrounding the enclosure;

a frame defining an acoustic chamber having an opening to the ambient environment and one or more interior sloping surfaces coupled to an acoustic port of a transducer positioned within the interior chamber of the enclosure, and the one or more interior sloping surfaces define a bottom portion of the acoustic chamber and are inclined upwards when moving in a direction from a side wall of the frame defining the opening to the acoustic port;

an acoustic mesh coupled to the opening to the ambient environment; and a blocking member coupled to the acoustic mesh to acoustically close a portion of the acoustic mesh.

13. The portable electronic device of claim 12 wherein the opening to the ambient environment extends through the enclosure.

14. The portable electronic device of claim 12 wherein the side wall extends from the opening to the one or more interior sloping surfaces, and a height of the acoustic chamber near the side wall is greater than a height of the acoustic chamber near the acoustic port.

15. The portable electronic device of claim 12 wherein an angle of a slope defined by the one or more interior sloping surfaces is between zero degrees and forty-five degrees.

16. The portable electronic device of claim 12 wherein the acoustic port is entirely surrounded by the one or more interior sloping surfaces.

17. The portable electronic device of claim 12 wherein the blocking member comprises a metal stiffener coupled to a center of the acoustic mesh and aligned over the acoustic port.

18. An earbud comprising:

an earbud enclosure defining an interior chamber separated from an ambient environment surrounding the earbud enclosure;

a frame defining an acoustic chamber having an opening to the ambient environment and one or more interior sloping surfaces defining a bottom surface of the acoustic chamber having a frustoconical shape surrounding an acoustic port of a microphone positioned within the interior chamber of the earbud enclosure;

an acoustic mesh coupled to the opening to the ambient environment; and a blocking member coupled to the acoustic mesh to acoustically close a center portion of the acoustic mesh.

19. The earbud of claim 18 wherein at least one interior sloping surface of the one or more interior sloping surfaces is a flat surface inclined upwards when moving in a direction from a side wall of the frame defining the opening to the acoustic port.

20. The earbud of claim 18 wherein at least two interior sloping surfaces of the one or more interior sloping surfaces extend in different directions from the acoustic port to a side wall of the frame.

21. The earbud of claim 18 wherein the blocking member comprises a metal stiffener coupled to the center of the acoustic mesh.

* * * * *